Jan. 3, 1950     E. A. ESKOLA     2,493,124
OCCUPANT PROPELLED VEHICLE

Filed Oct. 28, 1947     2 Sheets-Sheet 2

INVENTOR.
Edmund A. Eskola
BY
McMorrow, Berman + Davidson
ATTORNEYS

Patented Jan. 3, 1950

2,493,124

UNITED STATES PATENT OFFICE 2,493,124

OCCUPANT PROPELLED VEHICLE

Edmund A. Eskola, Bothell, Wash.

Application October 28, 1947, Serial No. 782,657

4 Claims. (Cl. 280—246)

This invention relates to improvements in occupant-propelled vehicles, and more particularly to an improved hand-propelled vehicle especially adapted for use in setting plants, weeding, and other gardening activities.

It is among the objects of the invention to provide an improved hand-propelled, foot-guided vehicle arranged to support an occupant in a sitting position close to the ground, which vehicle is of simple, durable and economical construction, of light weight, easy to propel and steer, highly stable in operation and especially arranged so that an occupant of the vehicle can conveniently set plants into the ground and perform other work while seated on the vehicle.

Other objects and advantages will become apparent from a consideration of the following description in conjunction with the accompanying drawings, wherein:

Figure 4 is a longitudinal cross-section of the front wheel and front wheel axle of the vehicle on an enlarged scale and taken substantially on the line 4—4 of Figure 2;

Figure 5 is a longitudinal cross-section on an enlarged scale of a fragmentary rear portion of the vehicle taken substantially on the line 5—5 of Figure 1; and Figure 6 is a top plan view of a fragmentary rear portion of the vehicle, portions being broken away and shown in cross section to better illustrate the construction thereof.

Figure 1:
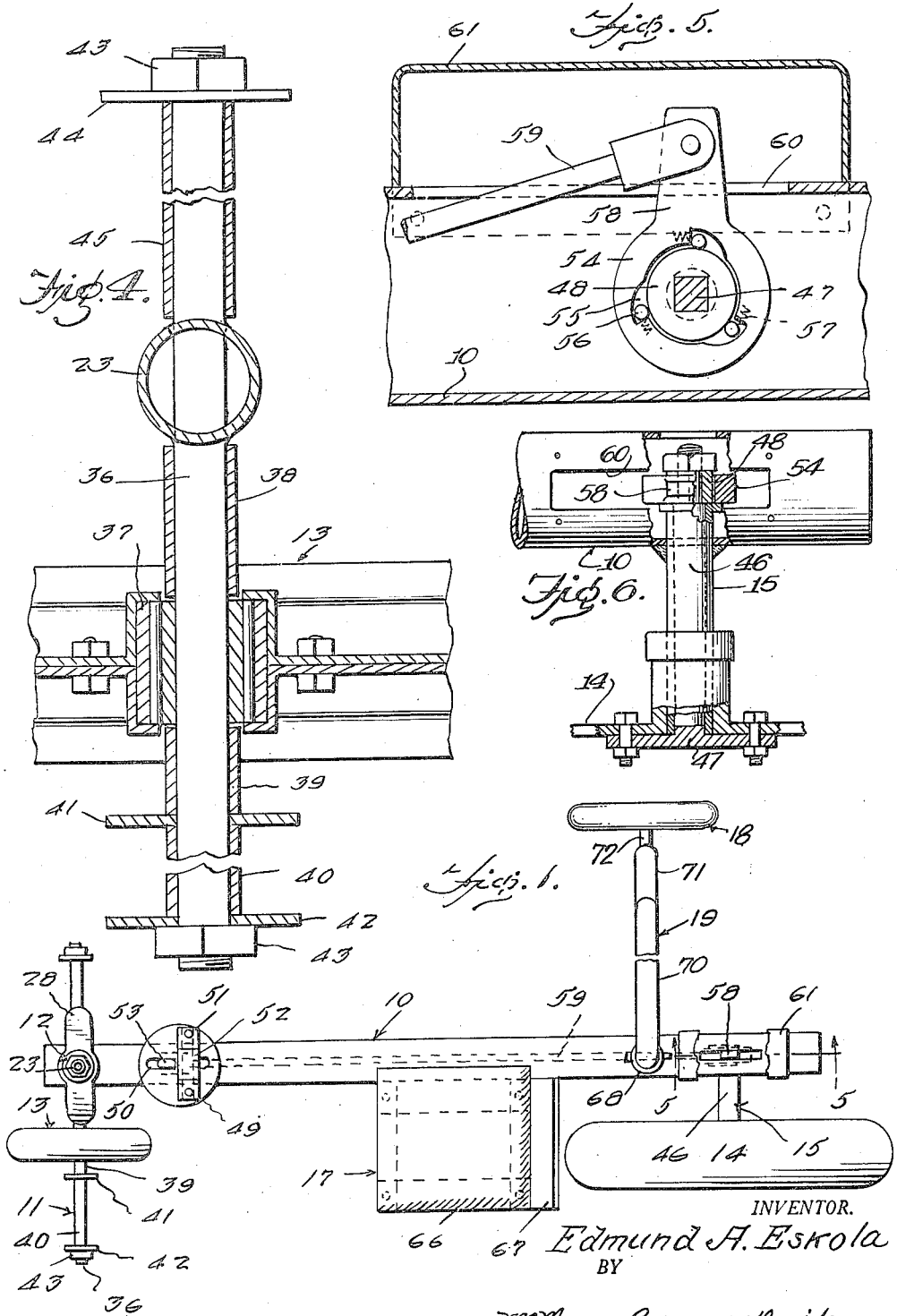
Figure 1 is a top plan view of an occupant-propelled vehicle illustrative of the invention.
Figure 2:
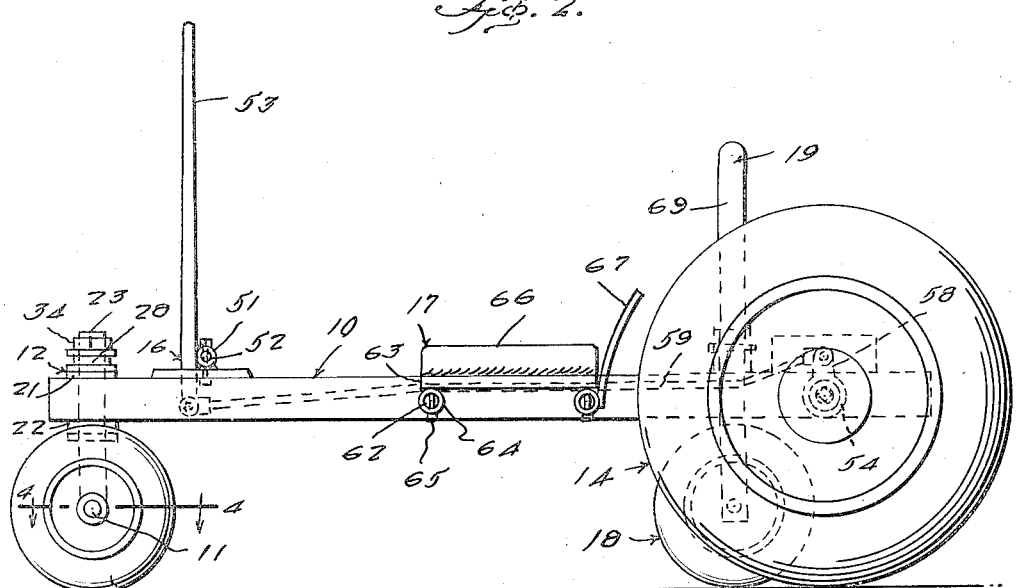
Figure 2 is a side elevation of the vehicle illustrated in Figure 1.

With continued reference to the drawings, and particularly to Figures 1 and 2, the vehicle comprises, in general, an elongated tubular frame bar 10, a front axle 11, a front axle mounting 12, a front wheel 13 journaled on the axle 11, a rear drive wheel 14, a rear wheel mounting 15, manually-operated rear wheel driving means 16, a seat and seat support 17, a third wheel 18, and a third wheel support 19.

In order to simplify the description, the vehicle will be considered in the operative position illustrated in Figure 2, and the terms "upper," "lower," "vertical," "horizontal," "front" and "rear" will be used to define the position and relationship of the various components.

The frame bar 10 is conveniently provided as an elongated tubular member of sufficient diameter and wall thickness to provide a rigid and durable frame for the vehicle, and has two elongated, longitudinally-aligned slots in the upper side thereof positioned one near the front end, and one near the rear end of the bar, a pair of diametrically-aligned apertures or openings in the front end portion thereof disposed one in the upper, and one in the lower side of the frame bar, and a single aperture or opening in the rear end portion thereof disposed substantially midway between the upper and lower sides of the bar.

Figure 3:
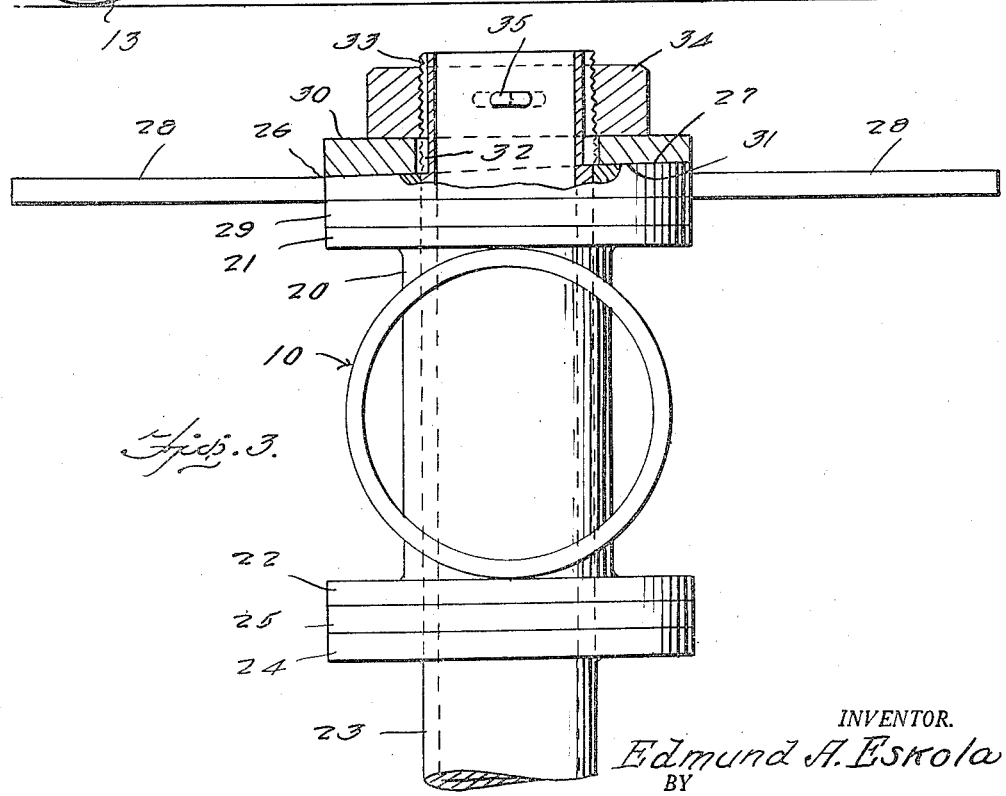
Figure 3 is a front end elevation on an enlarged scale of a fragmentary portion of the vehicle, a portion being broken away and shown in cross-section to better illustrate the construction thereof.

The front wheel supporting structure is particularly illustrated in Figures 3 and 4, and comprises a tubular bushing 20 extending through the diametrically-aligned apertures in the front end portion of the frame bar 10 and rigidly secured to the frame bar by suitable means, such as welding or brazing. This bushing extends somewhat above and below the frame bar and is provided on its upper end with an annular bearing flange 21 and on its lower end with a similar annular bearing flange 22. A tubular shaft 23 extends through and is journaled in the bushing 20 and an annular-supporting flange 24 is secured on this shaft intermediate its length and in position to support the lower bearing flange 22 on the bushing 20, a suitable thrust washer or bearing 25 preferably being interposed between the flanges 22 and 24 to provide an anti-friction bearing supporting the load of the front end of the vehicle upon the steerable front wheel 13 through the shaft 23. A bearing washer 26 surrounds the shaft 23 above the upper bearing flange 21 of bushing 20 and is provided with an upper-inclined surface 27 and a pair of radially-extending, diametrically-opposed arms 28, a thrust washer or bearing 29 preferably being interposed between this bearing washer 26 and the bearing flange 21. A locking washer 30 surrounds shaft 23 above bearing washer 26 and has an inclined lower face 31 complementary to the inclined face 27 of washer 26. This washer has, in the bore thereof, a tongue 32 received in a longitudinal groove 33 in the externally-screw-threaded upper-end portion of shaft 23 to restrain washer 30 against rotation relative to the shaft. A nut 34 is threaded onto the upper end of the shaft 23 and bears against the upper surface of washer 30 and is locked in adjusted position by suitable means, such as the cotter key 35.

With this arrangement, pressure may be applied to either one of the arms 28 by a foot of the vehicle occupant to rotate washer 26 relative to washer 30, whereupon the inclined adjoining faces of these two washers provide a cam action which frictionally locks shaft 23 relative to bushing 20 so that shaft 23 can be held at any desired position of rotation in bushing 20, if desired. The shaft can be released for free rotation in the bushing by foot pressure on the opposite arm 28.

A tubular axle 36 extends through the lower end portion of shaft 23 and is rigidly secured thereto by suitable means, such as welding or brazing. This axle is substantially perpendicular to the shaft and extends a greater distance to one side of the shaft than to the other, as is clearly illustrated in Figure 1. The front wheel 13 is journaled on axle 36 by a suitable anti-friction bearing 37 mounted on the longer end portion of axle 36 and spaced from shaft 23. As is clearly illustrated in Figure 2, the length of shaft 23 from the lower flange 24 to axle 36 is such that front wheel 13 is disposed entirely below the front end portion of frame bar 10 and may thus be turned to any angular steering position without interference between the wheel and the frame bar. Bearing 37 is held away from shaft 23 by a tubular spacer 38 surrounding the axle between the bearing and the shaft and is secured against the outer end of spacer 38 by two tubular spacers 39 and 40, two spaced-apart washers 41 and 42, and a nut 43 threaded onto the outer end of the axle. Spacer 39 is interposed between the outer end of bearing 37 and washer 41, spacer 40 is interposed between washers 41 and 42, and the nut bears against the outer face of washer 42 to clamp the assembly including spacer 38, bearing 37, spacer 39, washer 41, spacer 40, and washer 42 on the associated end of axle 36 between the nut and the lower end portion of shaft 23. The space between washers 41 and 42 provides a foot rest at the corresponding end of the axle for turning the axle and front wheel 13 in one direction of steering.

A similar nut 43 is threaded on the opposite end of the axle against a washer 44 which is held in operative position against the nut by a tubular spacer 45 which surrounds the end portion of axle 36 at the side of shaft 23 opposite the end portion of the axle upon which the wheel 13 is mounted. It is not necessary to provide an inner washer on this shorter end of the axle since the purpose of the inner washer 41 is mainly to maintain the occupant's foot away from the wheel 13. The two spacers 40 and 45 thus provide foot rests at the opposite ends of the axle so disposed that foot pressure thereon is effective to turn the axle and front wheel 13 in either direction to steer the vehicle. When the front wheel has been set at a desired steering position it may be releasably locked in such position by pressure on one of the arms 28 and may be released by similar pressure on the opposite arm.

The mounting means 15 for the rear wheel 14 comprises a sleeve 46 secured at one end to the side of the frame bar 10 in which the rear aperture is provided. This sleeve extends through said aperture from within said frame bar outwardly of the latter substantially at right angles thereto and is normally, substantially horizontal as is the front axle 36. The sleeve 46 functions as an axle housing and an axle shaft 47, as shown in Figure 5, is journaled in this housing and secured at its outer end to the hub of rear wheel 14 in a manner such that the wheel is constrained to rotate with the axle. A disc-like or cylindrical part 48 constituting the inner component of a one-way clutch is secured on the inner end of axle 47 against the inner end of sleeve 46, and together with the hub of wheel 14, restrains the axle against longitudinal movement in the sleeve.

The manually-operated driving means for the rear wheel 14 comprises a flat pad 49, preferably of circular shape, welded or otherwise secured to the top side of frame bar 10 adjacent the forward end thereof and having an elongated aperture 50 which registers with the slot provided in the top forward portion of the frame bar. A pair of spaced-apart bearing rings 51 are secured to the upper surface of pad 49 in longitudinal alignment with each other and disposed one at each side of aperture 50 and a pin 52 extends through these bearing rings and has its ends journaled therein. A lever 53 is welded or otherwise secured adjacent its lower end to pin 52 between bearing rings 51 and extends upwardly from the forward end portion of frame bar 10, as is clearly illustrated in Figure 2. The lower end portion of this lever passes through aperture 50 and the slot in the upper side of frame bar 10 to the interior of the tubular frame bar. An outer one-way clutch ring 54 surrounds the inner ring or member 48 and is provided with tapered roller seats 55 in which are disposed respective clutch rollers 56 urged into wedging position between the tapered seats and the periphery of the inner clutch member 48 by respective compression springs 57 in a manner well-known to the art. An apertured arm 58 extends upwardly from the outer ring 54 and this arm is operatively connected to the lower end of lever 53 by a link 59 which extends longitudinally through the frame bar 10 and is pivotally connected at its opposite ends to the lower end of lever 53 and the outer end of arm 58, as is clearly illustrated in Figure 2.

In order that arm 58 may have a length necessary to transmit sufficient power to the rear driving wheel 14, it is extended upwardly through the slot 60 provided in the upper side of the rear portion of frame bar 10 and the rear end portion of link 59 is inclined upwardly and connected to arm 58 above the upper side of the frame bar. The connection between the rear end of the link and arm 58 is protected by a housing 61 secured on the upper side of frame bar 10 over the slot 60.

While a one-way roller clutch has been illustrated as interposed between the rear end of link 59 and the rear wheel axle 47, a suitable ratchet mechanism may be substituted for this one-way clutch without, in any way, exceeding the scope of the invention. In this case the inner clutch member 48 could be provided with peripheral ratchet teeth and the outer member 54 provided with spring-biased pawls operatively engaging the ratchet teeth to rotate the member 48 and axle 47 in a forward direction.

The seat and seat support 17 comprises a pair of supporting rods 62 projecting outwardly from the side of the frame bar 10 from which the rear axle housing sleeve 46 projects substantially perpendicular to the frame bar and horizontal when the vehicle is in operative position. A seat base 63 is secured to these rods by suitable means, such as the clamp rings 64 and set screws 65 and a seat cushion 66 is secured on the upper surface of the base 63. If desired, a short back 67 may be attached to the rear edge of the seat base to extend a short distance above the upper surface of cushion 66.

While the rods 62 may be welded or similarly secured to the frame bar 10 for convenience in construction, it is within the scope of the invention to secure these rods to the frame bar by suitable, adjustable clamps so that the seat can be adjusted forwardly and rearwardly of the frame bar to accommodate the vehicle to occupants of different heights.

The support 19 for the third wheel 18 comprises a tubular wicket of inverted U-shape which has one end secured in a suitable pipe fitting 68 which is welded or otherwise suitably secured to the upper side of frame bar 10 between seat 17 and housing 61, and which has a portion 69 extending substantially vertically upward from the frame bar, a generally horizontal portion 70 extending outwardly from the frame bar substantially at right angles thereto at the side of the frame bar opposite that from which the rear axle housing sleeve 46 extends, and a portion 71 which is inclined somewhat outwardly and extends downwardly from the outer end of the substantially horizontal portion 70, and an axle pin 72 projecting from the outer end of wicket 19 into the hub of wheel 18. The third wheel 18 is thus supported at one side of the vehicle at a distance from the wheels 13 and 14 sufficient to provide a high degree of stability for the vehicle and the upwardly-curved wicket 19 will pass over a row of plants adjacent to a row to which the seat 17 is conveniently located.

There is thus provided a strong and durable occupant-propelled vehicle of small size and light weight which may be conveniently used in various gardening operations, such as setting plants, weeding, picking berries or other produce and for similar purposes.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An occupant-propelled vehicle comprising a longitudinally-extending, tubular frame bar, a front steering wheel, means mounting said front steering wheel to the forward end portion of said frame bar for steering movements relative thereto, a rear drive wheel, means operatively mounting said rear wheel on the rear end portion of said frame bar, manually-operable means carried by said frame bar and operatively connected with said rear wheel to drive the same, a seat, means supporting said seat at one side of said frame bar between said front and rear wheels, a third wheel, and means supporting said third wheel from said frame bar in position offset from the side thereof opposite said seat, said means mounting said front wheel to said frame bar comprising a normally vertical bushing extending diametrically through the forward end portion of said tubular frame bar and having an annular bearing flange at each end thereof, a tubular shaft extending through and journaled in said bushing having intermediate its length an annular bearing flange supporting the bottom flange on said bushing, an axle secured in the lower end portion of said shaft and extending through said front wheel and beyond said wheel and said shaft to provide foot rests for steering said wheel, a bearing washer surrounding said shaft above the top flange of said bushing having an inclined top face and a pair of diametrically-opposed arms extending therefrom, a second washer surrounding said shaft and secured thereto against relative rotation having an inclined bottom face complementary to the inclined top face of said bearing washer, and a nut threaded onto the upper end portion of said shaft and bearing on said second washer, said bearing washer being effective to releasably lock said shaft against rotation in said bushing upon the application of washer-turning pressure to one of said arms.

2. An occupant-propelled vehicle comprising a longitudinally-extending, tubular frame bar, a front steering wheel, means mounting said front steering wheel to the forward end portion of said frame bar for steering movements relative thereto, a rear drive wheel, means operatively mounting said rear wheel on the rear end portion of said frame bar, manually-operable means carried by said frame bar and operatively connected with said rear wheel to drive the same, a seat, means supporting said seat at one side of said frame bar between said front and rear wheels, a third wheel, and means supporting said third wheel from said frame bar in position offset from the side thereof opposite said seat, said means operatively mounting said rear driving wheel on said frame bar, comprising a normally horizontal sleeve secured at one end to the rear end portion of said frame bar and extending perpendicularly therefrom, an axle journaled in said sleeve and secured at its outer end to said rear driving wheel, and a clutch inner member secured on said axle at the inner end of said sleeve, said wheel and said clutch member holding said axle against longitudinal displacement relative to said sleeve.

3. An occupant-propelled vehicle comprising a longitudinally-extending, tubular frame bar, a front steering wheel, means mounting said front steering wheel to the forward end portion of said frame bar for steering movements relative thereto, a rear drive wheel, means operatively mounting said rear wheel on the rear end portion of said frame bar, manually-operable means carried by said frame bar and operatively connected with said rear wheel to drive the same, a seat, means supporting said seat at one side of said frame bar between said front and rear wheels, a third wheel, and means supporting said third wheel from said frame bar in position offset from the side thereof opposite said seat, said manually-operable means for driving said rear wheel comprising a flat pad mounted on the front end portion of said frame bar and having an elongated aperture opening to the interior of said frame bar, a pair of bearing rings secured on said pad one at each side of said aperture, a pin journaled in said rings, a lever secured to said pin between said rings, extending above said frame bar and having its lower end disposed within said frame bar, a rear wheel axle, an inner one-way clutch part secured to said axle within said frame bar, an outer one-way clutch part operatively surrounding said inner part, and a link operatively connecting the lower end of said lever and said outer clutch part.

4. An occupant-propelled vehicle comprising a longitudinally-extending, tubular frame bar, a front steering wheel, means mounting said front steering wheel to the forward end portion of said frame bar for steering movements relative thereto, a rear drive wheel, means operatively mounting said rear wheel on the rear end portion of said frame bar, manually-operable means carried by said frame bar and operatively connected with said rear wheel to drive the same, a seat, means supporting said seat at one side of said frame bar between said front and rear wheels, a third wheel, and means supporting said third wheel from said frame bar in position offset from the side thereof opposite said seat, said means supporting said third wheel from said frame bar comprising a tubular wicket secured at one end to the top of said frame bar adjacent the rear wheel end thereof and having said third wheel journaled at its opposite end, said wicket extending upwardly from said frame bar, laterally thereof, and then downwardly to said third wheel.

EDMUND A. ESKOLA.

REFERENCES CITED

The following references are of record in the file of this patent:

UNITED STATES PATENTS

| Number | Name | Date |
|---|---|---|
| 573,285 | Pfautz | Dec. 15, 1896 |
| 1,443,037 | Parsons et al. | Jan. 23, 1923 |
| 1,714,283 | Stilson | May 21, 1929 |